Patented Mar. 3, 1953

2,630,398

UNITED STATES PATENT OFFICE 2,630,398

PROCESS OF BONDING A LAYER OF CHLOROSULFONATED POLYETHYLENE TO FABRIC

Richard E. Brooks, Franklin S. Chance, Thomas H. Crim, Jr., and Daniel E. Strain, Wilmington, Del., assignors to E. I. du Pont de Nemours & Company, Wilmington, Del., a corporation of Delaware No Drawing. Application March 15, 1946, Serial No. 654,822

1 Claim. (Cl. 154—139)

This invention relates to methods for adhesively bonding one surface to another. It also relates to adhesively bonded articles, such as adhesively coated fabrics, plywood, laminated paper, laminated cloth and other laminations which are united by means of an adhesive. More particularly, it relates to compositions in which coacting members are united by means of an adhesive bond comprising a cured chlorosulfonated polymer of ethylene.

The McQueen patent, U. S. 2,212,786, describes a process for the preparation of chlorosulfonated olefin polymers, such as chlorosulfonation products of normally solid polymers of ethylene or isobutylene. In the copending McAlevy et al. applications S. N. 507,874, filed October 27, 1943, now U. S. Patent 2,416,061, and S. N. 559,652, filed October 20, 1944, now abandoned, it is disclosed that cured products may be obtained by the heat-treatment of chlorosulfonated ethylene polymers. The chlorosulfonated polymers obtained in accordance with the McQueen patent are disclosed by McQueen to be useful as intermediates in chemical synthesis, and also suitable for use as tanning agents. The published art does not disclose that chlorosulfonated polythene or similar materials can be cured, or may be employed as adhesives.

An object of this invention is to provide improved compositions containing an adhesive bond. Another object is to provide, as a novel composition of matter, fabric adhesively bonded to synthetic resin, said composition being characterized by excellent resistance to moisture, high bond strength and outstanding resistance to repeated flexing and wear. Another object of the invention is to obtain novel laminated compositions having excellent dry and wet shear strengths. Another object is to provide a process for adhesively uniting wood, metal, cloth, leather, etc., surfaces at relatively low temperatures and pressures by means of a thermosetting adhesive which, prior to curing, has excellent storage properties. Still another object is to provide novel compositions in which a fabric is adhesively united to cured chlorosulfonated polythene. A still further object is to provide a composition in which glass or other laminae are united by means of chlorosulfonated polythene. Other objects of the invention will appear hereinafter.

These objects are accomplished in accordance with the invention by applying to the surface of a material to be adhesively united an uncured chlorosulfonated olefin polymer, such as an uncured chlorosulfonated polymer of ethylene, and maintaining the said surfaces in contact with the said chlorosulfonated polymer, which may, but need not necessarily, be mixed with vulcanization aids, while subjecting the composition to the action of heat and pressure which produces a cured chlorosulfonated polymer adhesively bonded to the said surface.

The chlorosulfonated polymers which may be employed in the practice of the invention may be illustrated by chlorosulfonated polythene and similar or equivalent chlorosulfonated polymethylenes (such as the chlorosulfonated products of polymethylenes obtained by hydrogenation of carbon monoxide or by the decomposition of diazomethane); chlorosulfonated polyisobutylene; chlorosulfonated ethylene/vinyl acetate copolymers; chlorosulfonated ethylene/vinyl chloride copolymers; chlorosulfonated ethylene/alkyl acrylate or alkacrylate copolymers; and, in general, chlorosulfonated normally solid polymers (including interpolymers) of ethylene, propylene and/or isobutylene.

The chlorosulfonated polymers employed in the practice of the invention may be prepared by any suitable method such as by reacting a solution of the polymer in an organic solvent, such as carbon tetrachloride, with a mixture of chlorine and sulfur dioxide, with sulfuryl chloride, or with a mixture of chlorine and sulfuryl chloride. The chlorine content of the chlorosulfonated polymer may be varied rather widely but should be within the range of 10% to 60%, preferably about 15% to 45%; the sulfur content (sulfur is considered to be present as —$SO_2Cl$ groups), should, in general, be about 0.1 to 5.0%, preferably about 0.2 to 2.5%.

While the chlorosulfonated polymers may be employed in the absence of compounding ingredients in the practice of the invention, it is frequently desirable to admix therewith, prior to curing various vulcanizing aids such as metal oxides (particularly polyvalent metal oxides such as, litharge, magnesia, zinc oxide, red lead and barium oxide), salts of polyvalent metals with weak acids such as, zinc stearate, lead abietate, magnesium adipate, lead sulfate, calcium carbonate, lead naphthenate, lead stearate, and the like; organic peroxy compounds, including hydroperoxides, diacyl peroxides, dialkyl peroxides, etc.; weak monobasic or polybasic acids of high molecular weight such as stearic acid or rosin; antioxidants and/or vulcanization accelerators such as, diphenylamine, mercaptobenzothiazole, tetramethyl thiuramidisulfide, phenyl-betanaphthylamine, and AgeRite Alba (an antioxidant and rubber accelerator marketed by R. T. Vanderbilt Company, and considered to be, essentially, a high molecular weight phenolic compound); fillers or reenforcing agents such as carbon black, barium sulfate, kaolin, diatomaceous earth, powdered talc, titanium dioxide, and calcium sulfate. Sulfur may also be included in the composition, but it is generally omitted since the vulcanization of the chlorosulfonated polymers takes place readily in the absence of sulfur. The quantities of these agents which give best results are, per 100 parts of the chlorosulfonated polymer: oxide of polyvalent metal, 2 to 60 parts, preferably 10 to 20 parts and with litharge especially 20 to 60 parts; rosin or equivalent, 0 to 30 parts, preferably 2 to 10 parts; antioxidant, 0.0 to 3.0, preferably 0.5 to 2.0 parts; accelerator, 0 to 8 parts, preferably 1 to 5 parts; inert fillers, or reenforcing agents, 0 to 500 parts, especially 0 to 30 parts. If desired, certain organic modifiers or extenders may be added to the vulcanization mixture. These include asphalt, polyisobutylene, polythene, Naftolens (which are, substantially, hydrocarbon products derived from the acid sludge in oil refining and marketed by Wilmington Chemical Corporation), factice, pine tar, and high-boiling esters such as Flexalyn (diethylene glycol abietate, marketed by Hercules Powder Company). These organic modifiers or extenders may be employed in quantity equivalent to from 0 to 100 parts per part of the uncured chlorosulfonated polymer, preferably 0 to 20 parts per 100 parts thereof. While numerous formulations may be employed, the most outstanding results are obtained when the chlorosulfonated polythene is cured in the presence of litharge and rosin, and preferably also in the presence of one or more vulcanization accelerators.

The materials which may be adhesively bonded by means of chlorosulfonated polymers in accordance with this invention, include wood, metals, glass, fabrics, plastics, rubber, leather, paper or other cellulosic materials, synthetic elastomers, and the like. One method of practicing the invention is to prepare an article in which the chlorosulfonated polymer is adhesively bonded to glass. Another method of practicing the invention is to adhesively bond glass laminae by means of the cured chlorosulfonated polymers. An important embodiment of the invention is adhesively coated fabric in which the adhesive bond is cured chlorosulfonated polythene, e. g., the adhesive bonding of fabrics to the chlorosulfonated polymer itself, or in compositions comprising a layer of fabric and a layer of the cured chlorosulfonated polymer. Another important embodiment is the adhesive bonding of fabric to rubber by means of an intervening layer of cured chlorosulfonated polymer. Other important embodiments include plywood adhesively bonded with the cured chlorosulfonated polymer, and metal to metal, or metal to elastomer, bonds containing the cured chlorosulfonated polymer as the adhesive. More specific embodiments include such compositions as inner tubes in which the metallic valve is adhesively bonded to the elastomer of which the tube is composed; can closures and the like; and tire retreads adhesively bonded to the tire by means of cured chlorosulfonated polythene. Still other embodiments include automobile tires in which the fabric, or reenforcing cord, whether of nylon, other textile material, or metal wire, is adhesively bonded to the rubbery components.

The preferred method for preparing the adhesively bonded compositions disclosed herein is to place chlorosulfonated polymer in contact with one or more other materials with which it forms an adhesive bond, and thereafter to subject the resultant composition to a temperature of about 100° to 300° C. under a sufficient pressure to cause the chlorosulfonated polythene to flow. If desired, the chlorosulfonated polythene may first be compounded by mixing with the ingredients set forth above, suitably on a regular rubber mill, which may be employed for this purpose at room temperature or at temperatures somewhat higher than room temperatures. The curing is preferably carried out at a temperature of 100° to 160° C., for a period of about 10 to 60 minutes, under a pressure of from about 15 to 500 pounds per square inch. Usually there is evidence of curing as the temperature approaches 60° C., although temperatures of 100° C. or slightly higher are generally employed. For most purposes there is no need for temperatures in excess of 180° C. during the curing operation, and temperatures in excess of 300° C. are not desired since they cause degradation of the chlorosulfonated polymer with the resultant formation of comparatively weak adhesive bonds. The invention also contemplates curing which is aided by radiation such as ultra-violet light. If desired, adhesively bonded articles may be prepared by curing the chlorosulfonated polymer while shaping it and the material with which it is to be adhesively bonded, in a suitably heated mold under pressure.

The invention is illustrated further by means of the following examples:

*Example 1.*—Chlorosulfonated polythene containing 34.1% Cl and 0.31% S was heated at 140° C. while being pressed between two aluminum plates. The aluminum plates became adhesively bonded, and the chlorosulfonated polythene changed in appearance, being converted to a vulcanizate having comparatively low plasticity.

*Example 2.*—A mixture obtained by compounding 100 parts by weight of chlorosulfonated polythene (30.0% Cl and 0.97% S) with 0.5 part of mercaptobenzothiazole, 1 parts AgeRite Alba, 20 parts of litharge and 3 parts of wood rosin was pressed between aluminum plates at a temperature of 125° C. for a period of 60 minutes. The chlorosulfonated polythene underwent a cure, and the aluminum plates became adhesively bonded.

*Example 3.*—A mixture obtained by compounding 100 parts of chlorosulfonated polythene (prepared by treating polythene in benzene solution with chlorine and $SO_2$ until a chlorosulfonated polythene containing 30.1% Cl and 0.7% S was obtained), 1 part mercaptobenzothiazole, 1 part AgeRite Alba, 15 parts of rosin, 20 parts of dibutyl phthalate, 30 parts carbon black, and 40 parts of ltharge was pressed against a glass plate at room temperature, for several days. The chlorosulfonated polythene firmly adhered to the plate of glass.

*Example 4.*— Cholorsulfonated polythene (30.1% Cl, 1.74% S) was compounded with 1 part AgeRite Alba, 1 part mercaptobenzothiazole, 20 parts litharge and 5 parts of rosin per 100 parts of chlorosulfonated polythene. The resulting mixture was sheeted thin and bonded between layers of cloth by heating at a temperature of 155° C. for 15 minutes under a positive pressure of about 10 to 20 pounds per square inch. The resulting product was placed in a flexing machine and it was found that, upon prolonged and repeated flexing, the cloth failed and the coating remained undamaged.

*Example 5.*—Chlorosulfonated polythene (30% Cl, 0.9% S) was compounded with 1 part AgeRite Alba, 1 part mercaptobenzothiazole, 10 parts rosin, 30 parts litharge and 10 parts of channel black per 100 parts of chlorosulfonated polythene. The resulting mixture was sheeted thin and bonded upon cloth by heating at a temperature of 155° C. for 15 minutes under a positive pressure of about 10 to 20 pounds per square inch. The product was flexed 160,000 times in a flexing machine, whereby the cloth was damaged but the coating remained intact and undamaged.

*Example 6.*—A mixture containing 100 parts chlorosulfonated polythene (30.1% Cl, 1.74% S), 60 parts of Advagum (a rubber extender marketed by the Advance Solvents and Chemicals Corporation), 1 part AgeRite Alba, 1 part mercaptobenzothiazole, 10 parts of rosin and 40 parts of litharge was compounded on a rubber mill. The resulting mixture was pressed into a sheet between stainless steel plates and the plates were then heated at 155° C. for 15 minutes. The plates became firmly bonded.

*Example 7.*—A mixture was prepared by milling 100 parts chlorosulfonated polythene, 40 parts of litharge, 15 parts of wood rosin, 1 part mercaptobenothiazole, and 1 part AgeRite Alba. This compounded batch was admixed in a solvent made up of 2 parts by volume of xylene and 1 part of methyl ethyl ketone, forming a suspension having a solids content of 10%. The resulting mixture was heated to about 100° C., which caused some thickening, and thereafter was applied to birch panels, $\frac{1}{16}$ inch thick, and plywood was prepared therefrom at a temperature of 145° C. to 150° C. for 30 minutes under a pressure of 200 pounds per square inch. The plywood obtained in this manner was tested according to Army-Navy specification AN-NN-P-511b and was found to have shear strength of 575 pounds per square inch (dry) and a shear strength of 230 pounds per square inch (after boiling water treatment).

*Example 8.*—A cement was prepared by admixing 10 grams of a compounded batch (made by milling 100 parts by weight chlorosulfonated polythene having a chlorine content of 30.1% and a sulfur content of 1.74% with 1 part AgeRite Alba, 1 part mercaptobenzothiazole, 10 parts of rosin and 40 parts of litharge) with 100 cc. of xylene. This cement was applied to cured smoked sheet rubber (having been compounded with 1 part AgeRite Alba, 1 part mercaptobenzothiazole, 10 parts zinc oxide, 50 parts carbon black, 5 parts stearic acid and 2 parts of sulfur, and cured for 60 minutes at 140° C.) and uncured chlorosulfonated polythene (compounded with 1 part AgeRite Alba, 1 part mercaptobenzothiazole, 10 parts of rosin and 40 parts of litharge), and the cement-coated surfaces were placed in contact. The resulting composition was heated in a press at a temperature of 155° C. for 15 minutes which caused the rubber and chlorosulfonated polythene to become adhesively bonded. The tensile strength of the resultant bond was 2700 pounds per square inch. Similar experiments were made with numerous solvents in place of xylene, viz. n-butyl acetate, carbon tetrachloride, and benzene; in these experiments the strength of the adhesive bond varied from 1150 to 2200 pounds per square inch.

*Example 9.*—Example 8 was repeated with xylene as the solvent, except that the compounded batch, used in making the cement, contained, in addition to the recited ingredients, 60 parts of Flexalyn. The tensile strength of the resultant adhesive bond was 2600 pounds per square inch.

It is to be understood that the foregoing examples are illustrative only and that many different embodiments of the invention will occur to those who are skilled in the art. For example, the products obtained in accordance with the process of this invention may be prepared in various pigmented forms, a wide variety of colors being possible through the use of appropriate pigmenting agents. Moreover, it is to be understood that the invention contemplates the use of tackifiers such as dibutyl phthalate, etc., to improve the adhesive bond prior to curing, it being obviously desirable in various practical methods for manufacturing the cured product to have a reasonably firm bond in the uncured stage.

The invention is especially useful in the manufacture of fabrics which are coated with a layer of cured chlorosulfonated polythene. Such fabrics have numerous properties which are superior to those of coated fabrics obtained by methods heretofore known to the art, one of the outstanding characteristics of the said fabrics being their resistance to prolonged use and their relative inertness towards air or other oxidizing agents.

Since many different embodiments may be made without departing from the spirit and scope thereof, it is to be understood that we do not limit ourselves except as set forth in the following claim.

We claim:

Process for preparing coated fabric which comprises applying to a fabric a coating comprising uncured chlorosulfonated polythene having a chlorine content of 15% to 45% and a sulfur content of 0.2 to 2.5% compounded with 30 to 60 parts of litharge, 2 to 10 parts of rosin and 0.5 to 2.0 parts of rubber antioxidant including mercaptobenzothiazole, per 100 parts of said chlorosulfonated polythene, heating the resulting coated fabric under pressure at a temperature of 100° to 160° C. and continuing the heating of the said fabric under pressure for a period of from 10 to 60 minutes whereby the coating becomes sufficiently firmly bonded to the fabric that it remains intact and undamaged when completely flexed 160,000 times.

RICHARD E. BROOKS.
FRANKLIN S. CHANCE.
THOMAS H. CRIM, Jr.
DANIEL E. STRAIN.

REFERENCES CITED

The following references are of record in the file of this patent:

UNITED STATES PATENTS

| Number | Name | Date |
|---|---|---|
| 2,153,553 | Fawcett et al. | Apr. 11, 1939 |
| 2,340,452 | Child et al. | Feb. 1, 1944 |
| 2,416,061 | McAlevy et al. | Feb. 18, 1947 |

FOREIGN PATENTS

| Number | Country | Date |
|---|---|---|
| 491,804 | Great Britain | Sept. 8, 1938 |
| 545,500 | Great Britain | Apr. 27, 1942 |
| 112,875 | Australia | Apr. 7, 1941 |